U S010997423B1

(12) United States Patent
Borras (10) Patent No.: US 10,997,423 B1
(45) Date of Patent: May 4, 2021

(54) VIDEO SURVEILLANCE SYSTEM HAVING ENHANCED VIDEO CAPTURE

(71) Applicant: NOA Inc., Miami Beach, FL (US)

(72) Inventor: Jaime Borras, Miramar, FL (US)

(73) Assignee: NOA, Inc., Miami Beach, FL (US)

( * ) Notice: Subject to any disclaimer, the term of this patent is extended or adjusted under 35 U.S.C. 154(b) by 0 days.

(21) Appl. No.: 16/884,159

(22) Filed: May 27, 2020

(51) Int. Cl.
*H04N 5/247* (2006.01)
*G06K 9/00* (2006.01)
*H04N 5/232* (2006.01)
*H04N 5/235* (2006.01)
*H04N 5/33* (2006.01)
*G06N 20/00* (2019.01)
*G10L 15/22* (2006.01)

(52) U.S. Cl.
CPC ......... *G06K 9/00718* (2013.01); *G06N 20/00* (2019.01); *G10L 15/22* (2013.01); *H04N 5/2354* (2013.01); *H04N 5/23219* (2013.01); *H04N 5/23245* (2013.01); *H04N 5/247* (2013.01); *H04N 5/33* (2013.01); *G06K 2009/00738* (2013.01); *G06K 2209/15* (2013.01); *G10L 2015/223* (2013.01)

(58) Field of Classification Search
None
See application file for complete search history.

(56) References Cited

U.S. PATENT DOCUMENTS

| 2004/0117638 | A1* | 6/2004 | Monroe | G07C 9/38 |
| | | | | 713/186 |
| 2006/0004582 | A1* | 1/2006 | Claudatos | H04N 7/18 |
| | | | | 704/275 |
| 2006/0077256 | A1* | 4/2006 | Silvemail | G08B 13/19647 |
| | | | | 348/143 |
| 2010/0026802 | A1* | 2/2010 | Titus | G08B 13/19613 |
| | | | | 348/143 |
| 2010/0195871 | A1* | 8/2010 | Simon | G06K 9/209 |
| | | | | 382/105 |
| 2012/0194342 | A1* | 8/2012 | Reinpoldt | G16H 50/80 |
| | | | | 340/573.1 |

* cited by examiner

*Primary Examiner* — Eileen M Adams
(74) *Attorney, Agent, or Firm* — The Concept Law Group, PA; Scott M. Garrett; Scott D. Smiley (57) ABSTRACT

A surveillance system includes a lower definition video camera and a higher definition video camera. The higher definition video is not recorded, generally, but video produced by the lower definition video camera is processed and compared to predefined videographic patterns to determine whether one or more events corresponding to the predefined videographic patterns has occurred. Likewise, inputs from other sources, such as audio, can be evaluated to determine if any predefined events have occurred. Upon determining that a predefined or triggering event has occurred, then video from the higher definition camera is recorded.

22 Claims, 7 Drawing Sheets

VIDEO SURVEILLANCE SYSTEM HAVING ENHANCED VIDEO CAPTURE

GOVERNMENT INTEREST

This invention was made with government support under Grant No. IIP-1330943 awarded by the National Science Foundation. The U.S. Government has certain rights in the invention.

FIELD OF THE INVENTION

The present invention relates generally to video surveillance systems, and more particularly to improving the quality of recorded events while reducing the amount of memory media required to record the event by using a high definition video system that only records when any one of a plurality of predefined events is determined to have occurred.

BACKGROUND OF THE INVENTION

Video surveillance is in widespread use and is commonly used to assist in solving crimes. A conventional video surveillance system uses one or more video camera systems that record continuously in order to not miss any event that may occur. As a result, a substantial amount of video recording media is required in order to store all of the video data. To offset the cost of video recording media, as well as the archive costs, the video camera systems used for surveillance are typically of a low definition quality, often not color or with poor color resolution. The low definition, low-resolution quality has a lower video storage media requirement as the amount of media required corresponds almost quadratically with the resolution of the video, even though some forms of video compression can mitigate that effect. As a result, though, low definition video, even when it captures an event, can be of such poor quality that details necessary to determine the identities of people in the video are not available.

Therefore, a need exists to overcome the problems with the prior art as discussed above.

SUMMARY OF THE INVENTION

In accordance with some embodiments of the inventive disclosure, there is provided a video surveillance system that includes a lower definition video system, including a lower definition video camera that is configured to operate continuously and produce a lower definition video stream. There is further included an event sensor that is configured to detect at least one type of defined event depicted in the low definition video stream. A higher definition video system is included that has a higher definition video camera, which is normally off and which is configured to commence operating upon the occurrence of the at least one type of defined event being detected by the event sensor. There is further included a memory for recording a higher definition video produced by the high definition video system.

In accordance with a further feature of the inventive disclosure, the higher definition video system further includes an artificial light source that is configured to be activated when the higher definition video system begins operating.

In accordance with a further feature of the inventive disclosure, the artificial light source is an infrared light source, and the higher definition video system includes an infrared camera.

In accordance with a further feature of the inventive disclosure, the event sensor further includes a microphone that is configured to receive acoustic signals from an area in a field of view of the lower definition video camera, and wherein the event sensor is configured to perform natural language processing on the acoustic signal and detect a keyword, wherein the at least one type of defined event includes detecting an utterance of the keyword with the microphone.

In accordance with a further feature of the inventive disclosure, the event sensor is configured to detect a human in motion in a field of view of the lower definition video camera in the lower definition video stream, and wherein the at least one type of defined event includes detecting a human in motion in the field of view of the lower definition camera.

In accordance with a further feature of the inventive disclosure, the lower definition camera is a black and white camera.

In accordance with a further feature of the inventive disclosure, the lower definition camera has a resolution of 360p or less, and the higher resolution camera has a resolution of 720p or higher.

In accordance with a further feature of the inventive disclosure, the event sensor is configured to perform facial recognition, and wherein the at least one type of defined event comprises detecting a matching face.

In accordance with a further feature of the inventive disclosure, the higher definition video camera is a first higher definition video camera and is collocated with the lower definition video camera, the system further comprising at least one additional higher definition camera that is not collocated with the lower definition camera.

In accordance with some embodiments of the inventive disclosure, there is provided a video surveillance system that includes a monitoring processor including an image and video processor, and a lower definition video camera coupled to the monitoring processor and configured to provide a lower definition video feed to the monitoring processor. The lower definition video camera has its own field of view. There is further included a higher definition video camera coupled to the monitoring processor and configured to provide a higher definition video feed to the monitoring processor, wherein the higher definition video camera is maintained in a normally off state. The higher definition video camera is arranged to have a field of view that is substantially shared with the field of view of the lower definition video camera. The monitoring processor is configured to process the lower definition video feed to detect any one of a plurality of predefined videographic events, and in response to detection of one of the plurality of predefined videographic events in the lower definition video feed, turn on the higher definition video camera to receive the higher definition video stream, and record the higher definition video stream to a video recording medium for at least a preselected period of time.

In accordance with a further feature of the inventive disclosure, the monitoring processor is further configured to turn on the higher definition video camera and record the higher definition video stream in response to a user input to the monitoring processor.

In accordance with a further feature of the inventive disclosure, there is a microphone for capturing audio input in a vicinity of the lower definition video camera, and wherein the monitoring processor is further configured to turn on the higher definition video camera and record the higher definition video stream in response to detection of an audio input received at the microphone that is one of a sound level exceeding a threshold, a voice recognition, or a keyword or phrase utterance recognized by natural language processing.

In accordance with a further feature of the inventive disclosure, the plurality of predefined videographic events includes a videographic event defined in a message received by the video surveillance system.

In accordance with a further feature of the inventive disclosure, the monitoring processor, lower definition video camera, and higher definition video camera are mounted in a vehicle.

In accordance with a further feature of the inventive disclosure, an artificial light source is included that is configured to be activated when the higher definition video camera is turned on.

In accordance with some embodiments of the inventive disclosure, there is provided a method of operating a video surveillance system having a lower definition video camera and a higher definition video camera. The method includes receiving, at a monitoring processor, a plurality of inputs including a lower definition video stream from the lower definition video camera, and buffering a most recent time duration of the lower definition video stream in a first video buffer. The method further includes buffering a most recent time duration of a higher definition video stream output by the higher definition video camera in a second video buffer while buffering the lower definition video stream, and wherein the most recent time duration of the higher definition video stream is a shorter time duration than the most recent time duration of the lower definition video stream. The method also includes detecting, by the monitoring processor, an occurrence of a predefined event in at least one of the plurality of inputs. In response to detecting the occurrence of the predefined event, the method includes concatenating the buffered lower definition video, the buffered higher definition video, and the higher definition video stream to be stored as a video record.

In accordance with a further feature of the inventive disclosure, detecting the occurrence of a predefined event comprises recognizing, by the monitoring processor, a predefined pattern in the lower definition video stream.

In accordance with a further feature of the inventive disclosure, detecting the occurrence of a predefined event comprises recognizing, by the monitoring processor, a predefined audio pattern in an audio input.

In accordance with a further feature of the inventive disclosure, receiving the plurality of inputs comprises receiving a message including a definition of one of an audio pattern or a videographic pattern.

In accordance with a further feature of the inventive disclosure, the videographic pattern comprises a vehicle license tag number.

Although the invention is illustrated and described herein as embodied in a video surveillance system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequences of instructions designed for execution on a computer system. "High definition video" means video at a higher resolution or quality than the video recorded by another camera within the same system, the latter being referred to as "low definition," and does not imply a particular resolution or range of resolutions. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
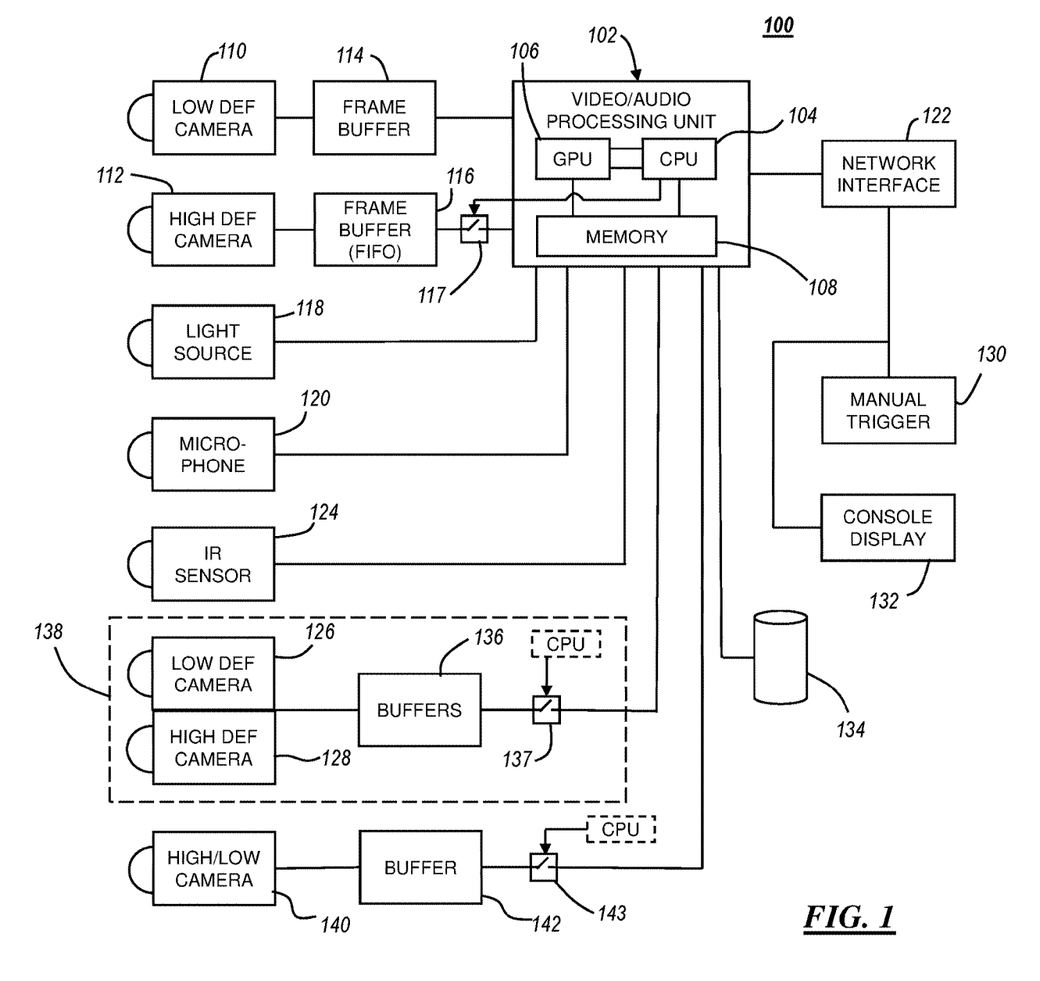
FIG. 1 is a block schematic diagram of a security system using on-demand analytic processing in response to the occurrence of a pre-defined event, in accordance with some embodiments.

FIG. 1 is a block schematic diagram of a surveillance system 100 using on-demand analytic processing in response to the occurrence of a pre-defined event, in accordance with some embodiments. The system 100 is primarily a video surveillance system that includes a general, low definition camera or cameras which can be used, in conjunction with other sensors, to detect the occurrence of an event. Various types of events can occur, some of which are detected automatically by the system, and some of which can result in a manual input to the system triggering the system to respond to the event. In response to the occurrence of a triggering event, the system 100 activates one or more high definition video recording systems which produce video content that is stored until either the end of a predetermined time period after the event is no longer detectable or valid, or a command is received by the system 100 to stop high definition recording. In addition, the system can also adjust or turn on lights, and commence recording audio in association with the recorded high resolution video. In this way low resolution video may be stored in bulk as necessary, or not at all, and the high resolution can provide much better video and audio definition of the event subsequent to being triggered. Thus, the data storage need is reduced compared to that of conventional surveillance video retention. As used herein, the terms "low definition" and "lower definition" can be used interchangeably, and the same is true for "high definition" and "higher definition." These terms indicate relative degrees of resolution and/or quality with respect to each other, and are not intended to be limited to specified ranges or degrees of resolution or quality. However, in some instances, particular resolutions can be useful for specific applications.

The system 100 includes a video and audio processing unit 102 that is specially configured to process and correlate video and audio from respective video and audio monitoring devices, and compare the content of received video and audio to pattern definitions which are used to trigger a higher definition video recording. In general, the video and audio processing unit 102 is a monitoring processor and operates as an event sensor, and processes audio and video inputs in an attempt to find correlations to predefined audio and visual patterns. The video and audio processing unit includes a central processing unit (CPU) 104 and a graphic processing unit (GPU) 106. Both the CPU 104 and GPU 106 are coupled to a memory 108, which can represent an aggregate memory of registers, latches, and random access memory (RANI), as well as read-only memory (ROM) and other forms of memory. The memory 108 is used to instantiate program code that is performed by the CPU 104 and GPU 106. The CPU 104 and GPU 106 can share memory, as well as have separate dedicated or partitioned memory for particular usage. The CPU 104 is responsible for the overall operation of the system 100, including providing a user interface for it, so that a user can configure the system 100 and provide data and control inputs, among other operations. The CPU can also process audio signals, using natural language recognition, as well as volume, speech rate, and other qualities that can be quantitatively determined. Likewise, the GPU 106 processes video from various sources to determine whether the content of the video is consistent with, or otherwise falls within a predefined rule that corresponds to a triggering event.

For example, the video and audio processing unit 102 can be operably connected to a low definition camera 110 through a frame or video buffer such as a lower resolution video buffer 114. The low definition camera 110 can have a low resolution, such as 360p or lower, and may be in black and white as well. In some embodiments the low definition camera 110 can produce video at a reduced frame rate as well, such as 24 frames per second or less. As a result, the video produced by the low definition camera 110 uses less bulk storage resources to store. The buffer 114 can buffer a number of frames equivalent to a selected duration of video such as, for example, five to ten seconds of video. That is, the buffer 114 contains only a most recent time duration of video; older frames of video are discarded as new ones are added to the buffer 114. The low definition video can be provided to the GPU 106 for processing, where the GPU identifies features such as edges, shapes, persons, and evaluates how these features change over a period of time, and whether those changes fall with a defined rule or rule set for a given triggering event. Raw or compressed video can be stored in a data store 134, that includes a video recording medium, along with rule definitions that are used by the GPU 106.

When either the CPU 104 or GPU 106 detects an audio of video event that meets a pre-defined rule or rule set for a given event, the CPU 104 or another processor of the video and audio processing unit can activate a high definition camera 112 to receive video from the high definition camera 112. In some embodiments, the high definition camera 112 can be on at all times, buffering a preselected duration of video in a frame buffer 116 (higher resolution video buffer). Upon being activated from switch 117, then, video produced by the high definition camera 112 can be stored. The frame buffer can hold, for example, five to ten seconds of recent video content produced by the high definition camera 112. The high definition camera 112 can have a resolution of at least 720p, and can have a higher than usual frame rate (e.g. more than 30 frames per second) so that details of objects and people, and motion can be better perceived when the video is reviewed. The buffer 116 allows for capture of the field of view prior to the detection of an event, which can provide other information regarding the detected event, and maintains a time duration of video that is generally a more recent or shorter duration of video than is stored in buffer 114.

In some embodiments the low definition camera 110 and the high definition camera can be substantially co-located and have approximately the same field of view. In some embodiments the low definition camera 110 and high definition camera 112 can have overlapping fields of view. In some embodiments the high definition camera 112 can have a larger field of view (e.g. zoomed out) that includes all or substantially all of the field of view of the low definition camera 110. Furthermore, in addition to the low definition camera 110, there can be other low definition cameras 126 and corresponding high definition cameras 128 in other camera units 138 that are coupled to either the video and audio processing unit 102 or a similar video and audio processing unit through buffers 136 that are substantially similar to buffers 114, 116, and which can be activated by switch 137 by the CPU 104, as with switch 117. To receive audio there can be one or more microphones 120 that are placed in conjunction with a camera set (e.g. 110, 112) to receive acoustic signals from audio sources in the field of view, and nearby, that can be monitored, processed, and recorded when necessary. In some embodiments the high definition cameras 112, 128 can be capable of converting infrared (IR) light to visible light, and when a triggering event occurs, an artificial light source 118 can include an IR light source that can be activated to possibly allow one of the high definition cameras 112, 128 to capture physical details that cannot be seen using visible light. For example, IR light can be used to capture details of the face of a person who is attempting to hide their face within a hood. Light source 118 can also include a visible light source that can be selectively activated based on the nature of the event that has been detected. An IR camera or sensor 124 can be used to detect thermal events (e.g. fire, gunfire), which can also trigger activation of the high definition camera(s). In addition, an infrared thermography unit can help detect elevated body temperatures, which may indicate fever and underlying infection at the entrance of an employment facility or a public place.

Under non-triggered monitoring, the video and audio processing unit 102 receives video from the low definition camera or cameras 110, 126, and audio from the one or more microphones 120, as well as signals from the IR sensor 124. These devices are set up to survey a given area, which can include indoor or outdoor areas, or both. The low definition cameras 110, 126 can be set up to have a field of view of a given premises (e.g. house, store, fuel station, etc.) in a conventional manner, with an emphasis on event detection rather than video recording as done with conventional video surveillance. High definition cameras 112, 128 can be set up to best capture events occurring at the premises as well. In some embodiments an event detected at a given low definition camera can result in video being obtained and recorded from all high definition cameras in the system 100, or the high definition camera video output can be selectively recorded based on having a similar or overlapping field of view with the low definition camera at which the event was detected.

The video and audio processing unit 102 can be coupled to a network interface 122 that can allow network connectively to a manual trigger 130 and/or a console display station 132. Alternatively, the manual trigger 130 and/or console display station can be connected directly to the video and audio processing unit 102. The manual trigger 130, can be, for example, a button switch or other manually operated electric device that sends a signal to the video and audio processing unit 102 to commence recording high definition video just as if an event had been detected in the monitored low definition video or the audio. For example, a person can press a button while working at a point of sale in a store in response to a robbery. An operator can trigger the system in response to events that are not detectable at the low definition camera or microphone, such as upon seeing an event occurring on nearby premises that are not monitored by the system 100 in case those remote events or persons involved in those events pass through the premises monitored by system 100. The console display 132 allows a user to interact with the video and audio processing unit 102 to, for example, review recorded high definition video and audio, set up or otherwise provision and configure the system 100, and manage the system 100. The console display 132 can include a general purpose computer having a graphic display and input such as a keyboard and mouse, and can run an application program or a browser client to interact with the video and audio processing unit 102 and other system components. The console display can also be used to add, delete, or edit rules or rule sets used by the video and audio processing unit 102 to determine whether an event has occurred. Video and audio can be stored in a data store 134, along with metadata describing the captured and stored media (e.g. time stamps, camera identifiers, etc.). The data store 134 can include a database in which metadata for the stored media can be organized, indexed, and made searchable.

In configuring the system 100, the display console 132 can be coupled to the video and audio processing unit 102. The processing unit 102 can have a plurality of different ports for connecting to cameras, microphones, light sources, light sensors, and other components (e.g. Wi-Fi detection, recording media access controls). The components can be set up in selected physical locations and coupled to a port of the processing unit 102 and provisioned to indicate what type of component it is, if automatic component detection/ recognition is not used. Various event detection rules can be enabled that the processing unit 102 will use in processing low definition video and audio feeds. In some cases the processing unit may require initial training. For example, at a point of sale, an area in the field of view of the low definition camera and be selected and identified as an area for employees, while an adjacent area can be identified as being for customers with a counter region between the two. This can be done, for example, using a graphic user interface while displaying the view from the low definition camera, and a pointing device can be used to draw a boundary around regions of interest. Thus, a rule can be designed so that, for example, if a person in the customer region of the field of view enters or crosses the counter region of the field of view, it will trigger a positive activation decision and high definition video will be recorded, and other components, such as light sources, may be activated. Numerous such rules can be defined and used by the processing unit, such as, for example, persons in unusual locations, persons moving fast through a field of view, abrupt changes in audio volume (e.g. yelling, screaming, gunfire), word recognition, object recognition, and so on. Likewise, rules can be learned based on the system being manually triggered in response to a human operator perceiving events and activating a manual trigger (e.g. 130). That is, when the system is manually triggered, the system can, at the direction of an operator, analyze video captured in the buffer immediately prior to the manual triggering to detect changes in motion, position, language used, and so on. A machine learning engine can use such inputs to generate a rule or rule set for the specific system 100, which can be augmented by manual input, such as identifying videographic events, patterns, or features in the captured video that indicate the occurrence of an event that is to trigger the system 100 to record the high definition video and audio feeds.

In some embodiments a single high/low camera 140 can be used. The high/low camera 140 is capable of operating in both a low definition mode and a high definition mode. The high/low camera 140 operates normally in a low definition mode, buffering a preselected duration of video media in a buffer 142. The low definition video (and audio) can be analyzed by the processing unit 102 to detect predefined events. Upon detecting the occurrence of a predefined event, the processing unit 102 can control the high/low camera 140 to change operating modes from a low definition mode to a high definition mode. Buffered video can be latched by the processing unit 102 so that the buffered low definition video captured prior to the triggering event can be kept and stored. A switch 143, operated by the CPU 104, can be used to control access to the buffered video, as with switches 117, 137. After the occurrence of the triggering event, the output of the high/low camera 140, operating in high definition mode, can be captured by the processing unit, concatenated with the latched low definition video, and stored in data store 134. In some embodiments using the high/low camera 140, a verification step can be included where, upon switching from the low definition mode to the high definition mode, the high definition video is buffered in buffer 142, and the processing unit 102 evaluates the high definition video to confirm occurrence of a triggering event, which can be a different triggering event than initially caused the change from low definition mode to high definition mode. For example, an initial triggering event can be visual in nature, such as detection of a weapon. After switching to high definition operation, sounds, or other visually identifiable features can confirm the initial event detection, resulting in the buffered high definition video and subsequent live high definition video being captured, concatenated with the low definition video, and stored.

The system 100 can be set up in a fixed application, such as for surveillance of a building or other fixed location in some embodiments. In other embodiments components of the system 100 can be used for mobile applications, and set up in a vehicular application. In mobile applications, the network interface 122 can be a wireless network interface that connects to cellular data systems to send and receive data, messages, and other information.

Figure 2:
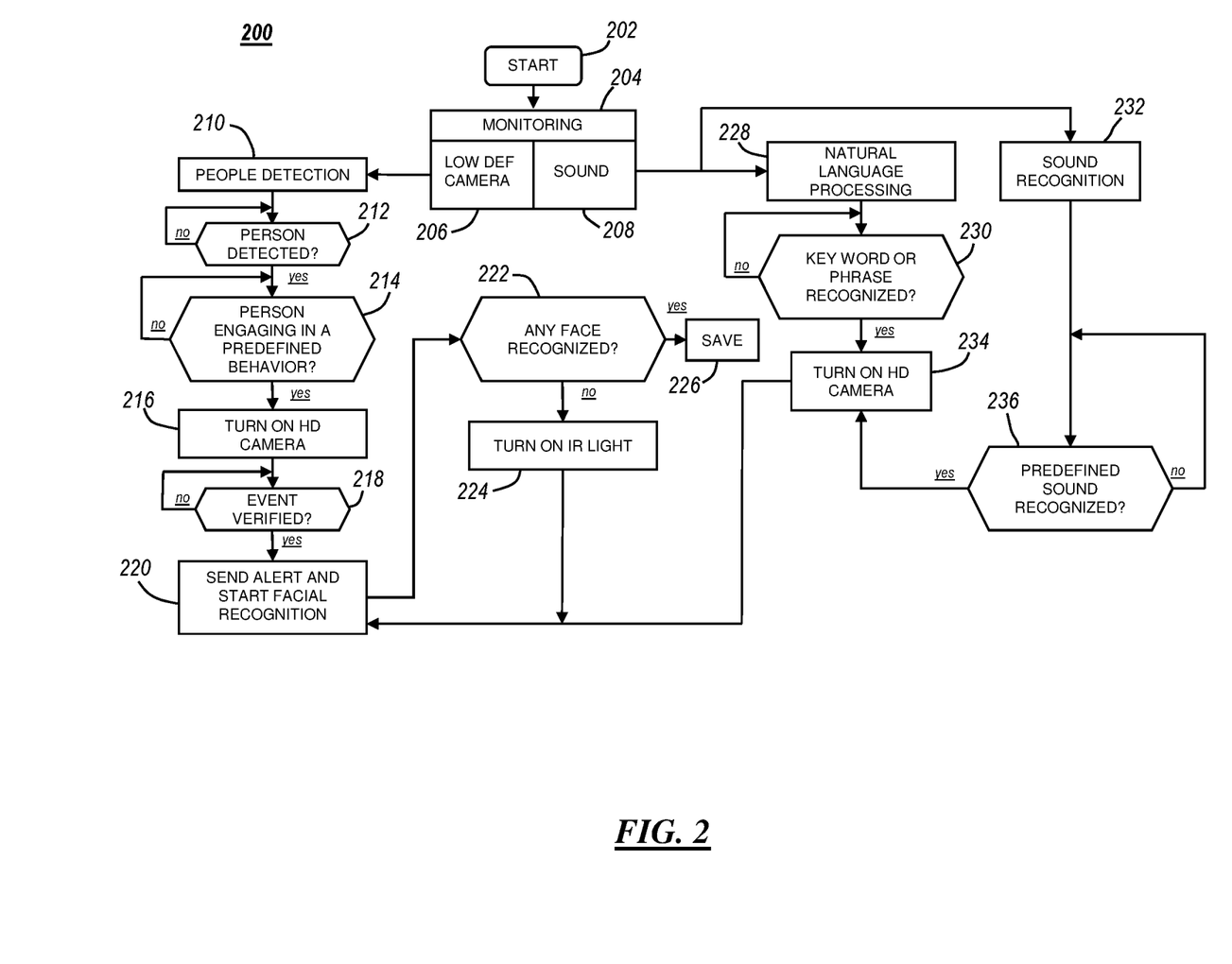
FIG. 2 is a flow chart diagram of a method for detecting and responding to a pre-defined event at a security system by enabling a high definition video capture system, in accordance with some embodiments.

FIG. 2 is a flow chart diagram of a method 200 for detecting and responding to a pre-defined event at a security system by enabling a high definition video capture system, in accordance with some embodiments. At the start 202 the surveillance system, such as system 100, is set up, provisioned, and operating. In block 204 the system is actively monitoring the low definition video 206 and the audio input (if available) 208. At the same time, the high definition camera can be buffering a short duration of video in a first in, first out (FIFO) type buffer. The video from the high definition camera is not, however, recorded until an event consistent with one or more of the predefined rules or rule sets is detected. The low definition video and the audio can be continuously recorded if desired. It is assumed that the high definition video and the low definition video are produced in digital formats that allow them to be analyzed by the processing unit (e.g. 102). Likewise, the audio signal produced by microphones can be digitized for processing and storage. Digitization allows the application of compression techniques to reduce storage resource requirement.

As an example of a rule set that can be evaluated by the system, in block 210 an initial recognition process can be used to recognize persons in the low definition video. In block 212 a decision is made as to whether, in response to running the person detection algorithm in processing the low definition video, a person has been detected in the field of view of the low definition camera. The person detection algorithm only makes a determination as to whether a person is present, and is not as involved as, for example, facial recognition. If so, then the process moves to block 214 to determine whether the identified person is engaged in a predefined behavior, which can include, for example, being in certain regions in the field of view, crossing specified regions in the field of view, moving rapidly through the field of view, waving their arms, or engaging in erratic movements, and so on. If a person is detected in the field of view engaging in any actions consistent with those defined in one or more rules or rule sets that define such behaviors, then in step 216 the high definition camera can be turned on, meaning the video from the high definition camera and buffered video produced by the high definition camera taken prior to the determination that the triggering event has occurred are stored.

In block 218 the event can be verified, such as by a user, or another processing of the rule or set of rules that resulted in the positive activation decision in block 214. In some embodiments the rule(s) used in block 214 can be applied to the high definition video in block 218 in order to verify the triggering event. In block 220, in some embodiments, upon verifying the event in 218 an alert can be sent to the console display, or some other entity that can be specified. The alert can be a simple electronic notification using any of the known notification techniques. At the same time, a facial recognition, or more specifically, a facial identification process can be started. Using the high definition video the facial characteristics of those persons in view of the high definition camera can be obtained and compared with facial recognition datasets to determine if there is a match. That is, the processing unit attempts to find a face in the video in block 222. If a face is recognized, the video being recorded can be annotated in metadata to indicate where the face or faces can be seen. In some embodiments, any identified faces can also be copied from the high definition video into one or more still images that can be stored in association with the high definition video file. Metadata associated with the still images can indicate, for example, the time stamp at which the still image can be seen in the associated high definition video. If, in block 222, no face is identified, then in block 224 a light source is turned on, such as an IR light source and/or a visible light source can be activated in an attempt to illuminate the person's face so that features can be distinguished. In some embodiments only an IR light can be activated in order to avoid alerting the person they are being illuminated, as would occur using a visible light source. Upon returning to block 220 an alert need not be sent again, and the facial identification process can simply continue until either a face is identified in block 222 and is saved in block 226 or the event ends.

It will be appreciated by those skilled in the art the processes described here can be applied to multiple cameras are the same time. That is, for example, in block 206 the video produced by multiple low definition cameras of the system can be processed in blocks 210-214. Likewise, in block 214 video from multiple high definition cameras can be processed in the subsequent blocks. Furthermore, the process represented by blocks 218-226 can be assumed to continue until the event is over, as indicated by manual input to the system, or after some time in which no videographic features indicate any qualifying event is still occurring.

Returning to block 204, audio can be processed in parallel with the video, without regard for the video processing. That is, sound can also trigger activation of the high definition video recording. The sound is generated by one or more microphones that have been deployed in the premises in conjunction with cameras for video monitoring. The acoustic signals received by the microphones can be processed to find audio or acoustic patterns. For example, in block 228 natural language processing can be applied to the sound received from the microphone(s), and in block 232, in a parallel operation, the sound is monitored for the occurrence of particular sounds or sound characteristics that correlate to a predefined audio pattern. The natural language processor 228 is configured to recognize and process utterances in spoken language, and identify words or phrases, including key words that have been predefined, in speech by people in the vicinity of the microphone of the system. In block 230, while monitoring the sound for spoken language, the process determines whether predefined words or phrases have been spoken. If one of the words or phrases are detected in block 230, then in block 234 the high definition video is recorded, as in block 216 while processing the video, and the process of block 220 can then be performed. Similarly, in block 236, the process monitors for the occurrence of a defined sound or sound characteristic (e.g. loud abrupt sounds, gunfire, etc.). If any sound is detected that meets the characteristics of a defined sound rule, then the process proceeds to block 234 as well.

Figure 3:
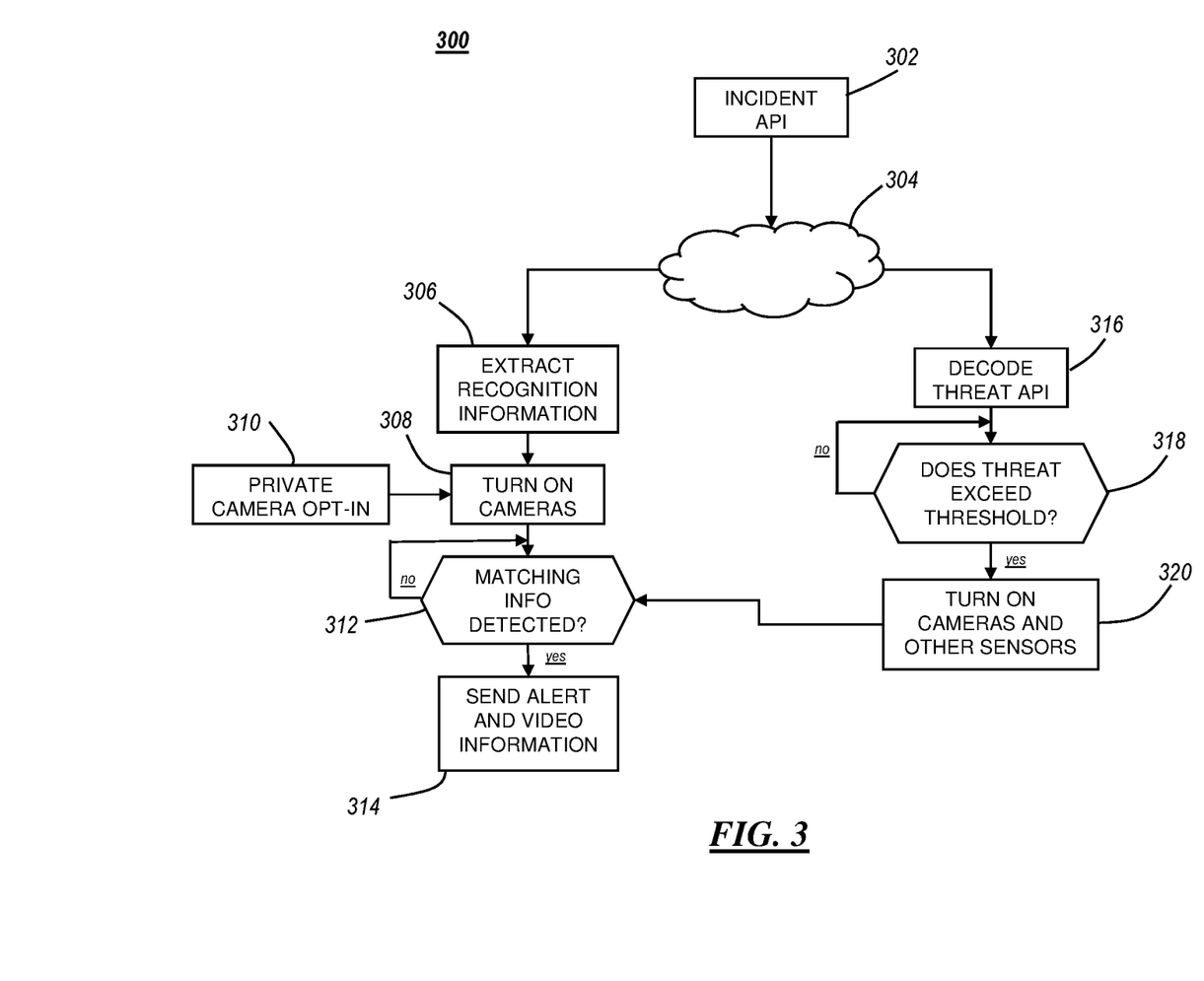
FIG. 3 is a flowchart for activating a high definition portion of a video surveillance system in response to a public alert message, in accordance with some embodiments.

FIG. 3 is flowchart of an activation method 300 for a high definition portion of a video surveillance system in response to a public alert message, in accordance with some embodiments. In particular the activation process is used to respond to triggering events originating outside of the system, such as alerts issued by governmental authorities. An incident application programming interface (API) 302 is used by an authority to access a network 304 to which a surveillance system is connected. The incident API 302 is used to transmit notification messages to participating systems, and can include information usable by the system, such as facial recognition parameters, an indication of an applicable geographic region, and other information that can be used by a system to identify, for example, persons and objects (e.g. license plate numbers). In block 306 the system receives an incident alert message that includes recognition information, which is information indicating what it is that the authority is attempting to find. The information extracted in block 306 can be facial recognition parameters, an image of a person that can be processed by the system to derive facial recognition parameters, and/or other information such as, for example, vehicle information (color, model, license tag, etc.). In addition to the information describing what it is authorities are attempting to find, the information can indicate a geographic region of interest as well as a time/date of interest.

In block 308 a decision has been made that the system is located in the region of interest, and the cameras can be activated. In addition, the system can re-evaluate any stored video content that was produced in the time of interest using the description information received from the authority. Block 310 indicates that the system has agreed to opt-in and participate. It will be appreciated that the system (e.g. system 100), while being described as installed at a fixed site, can also be installed on a mobile platform such as a vehicle, including both private as well as government vehicles. Thus, in a vehicular application cameras can be used to recognize other vehicles in the area around the camera-equipped vehicle.

In block 312 the system evaluates video produced by the one or more cameras of the system and determines if a match has been found that sufficiently correlates with the information received from the authority in block 306. If a match is found, then high definition video taken with the recognized person or object in the field of view can be sent to the authority in an alert message in block 314. The user, operator, or administrator of the system can likewise be alerted so that, for example, the personnel operating the system can potentially operate cameras of the system to zoom in on the recognized person or object.

In some embodiments the message received via the incident API can be a more general alert, such as, for example, a security threat message, such as when the government determines there to be potential for some incident such as a terror attack. In block 316 the system can receive a message indicating a general threat potential and a degree of the threat, along with other information such as that described in relation to block 306 (identifier information, geographic location, etc.). In block 318 the level and applicability of the threat are evaluated to determine if any action should be taken by the system. For example, governmental agencies classify threats on a scale, assigning a value to each level of the scale. The system operator can determine the combination of threat level and other factors that constitute an activation threshold. If the indicated threat meets or exceeds the threshold, then in block 320 the system is activated and cameras and other sensors are turned on (e.g. output is recorded). Once the cameras and other sensors are activated in block 320, in addition to recording video in general for possible later review, it is contemplated that the information received can include recognition information, and a process such as is performed in block 306 can be performed to acquire the recognition information. The method can move to block 312 to evaluate video data to determine if there is recognition of video data that sufficiently correlates to the recognition information.

Figure 4:
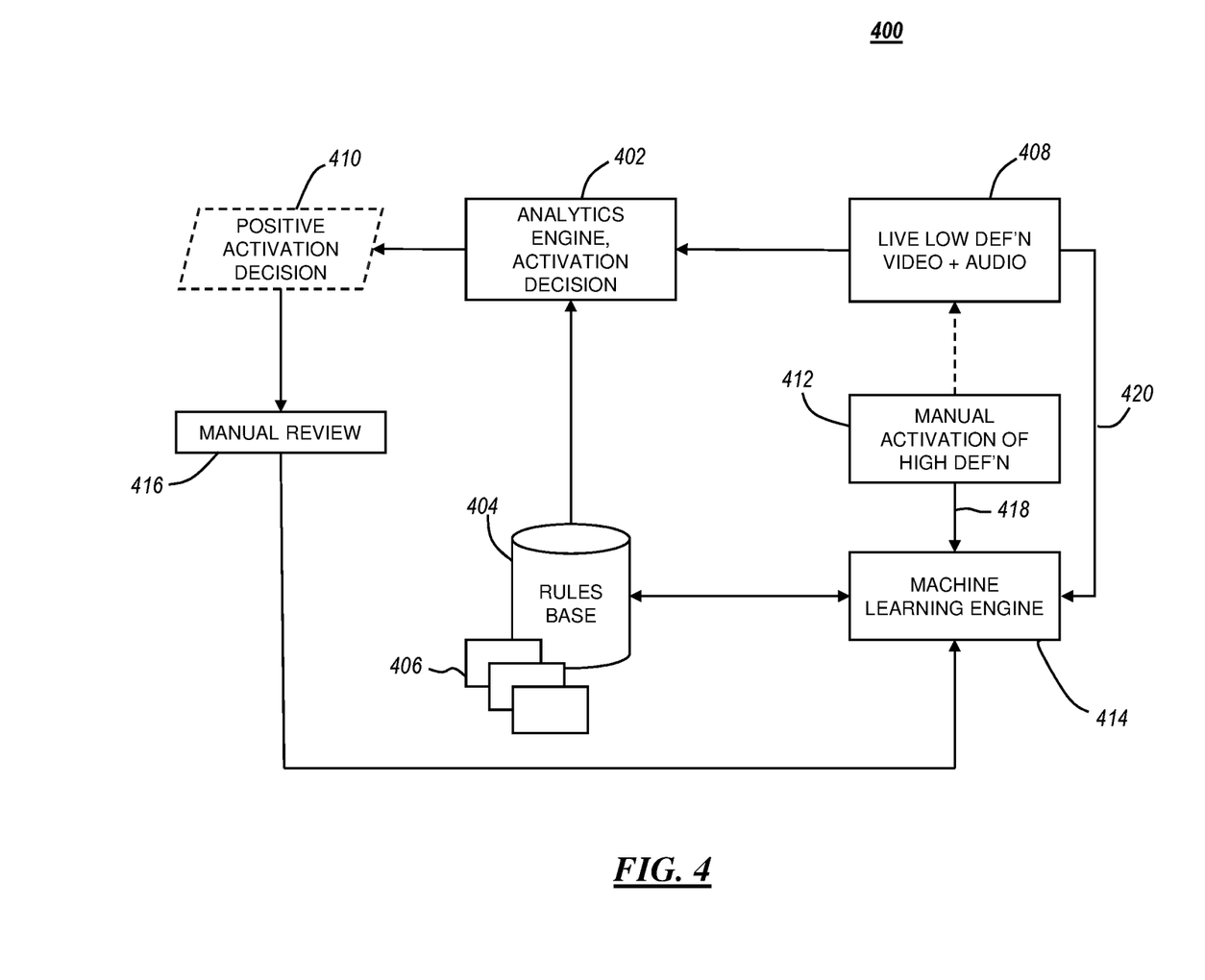
FIG. 4 is a block diagram for applying and creating analytic rules defining events that can be applied to video and audio inputs to trigger activation of a high definition surveillance system component, in accordance with some embodiments.

FIG. 4 is a block diagram 400 for applying and creating analytic rules defining events that can be applied to video and audio inputs to trigger activation of a high definition surveillance system component, in accordance with some embodiments. Central to the operation of the system is an analytics engine 402. The analytics engine 402 includes a media processor configured to perform computer code to evaluate various forms of input against applicable rules, and receives monitoring input 408 that includes video and can also include other input such as audio, infrared signal, motion sensing, etc. In some embodiments the monitoring input 408 includes low definition video provided by one or more low definition cameras of the system. For each type of monitoring input 408 being evaluated, the analytic engine has to compare the stream of monitoring input 408 with various rule parameters as provided in rules and rule sets 406 stored in a rules data store or database 404. The rules 406 indicate conditions that can be detected in the media streams. Some conditions can only be detected over a period of time, and some can be detected in a single frame of video. Examples of rules can include, for example, words or phrases recognized by natural language processing of audio, detection of unusual sounds (e.g. high, abrupt volume), facial identification and recognition, identification of a person moving through a region in a field of view, rapid movement of a person, and so on.

When the analytics engine is active, it determines which rules are applicable. Some rules will be generally applicable at all times, others can be applicable only for a specified time, such as those received from an external authority. As video, audio, and other inputs 408 are evaluated under applicable rules, the analytics engine may detect content that meets the parameters of a given rule, in which case a positive activation decision 410 event is generated, and the system will, in response, commence recording the high definition video and other input. The analytics engine 402 can then also use the high definition video to re-evaluate the triggering rule to verify that the rule parameters have been met (e.g. block 218 of FIG. 2).

Another input that can be used by the system is the manual triggering 412 of the high definition video recording by user input. No rule is required to respond to the manual trigger as it overrides rule evaluation by the analytics engine 402, rather, the high definition video recording is automatically activated in response to the manual triggering. The manual trigger can occur by, for example, an operator pressing an emergency response button. However, while the manual triggering allows an operator to decide that something has occurred that needs to be recorded, operators can differ in judgment and attention. Accordingly, it would be beneficial to generate rules based on manual triggering. When a manual triggering event occurs, a machine learning engine 414 can receive or be provided with an indication of the manual triggering as indicated by arrow 418. Likewise, the low and high definition video and audio information that occurred prior to (as buffered), during, and after the manual triggering can be provided to the machine learning engine 414. The machine learning engine 414 then evaluates the video and audio to identify features in the video and audio as indicated by arrow 420. Each time a manual triggering occurs the machine learning engine 414 can identify features in the video and compare them with video content related to prior manual triggering events, classify features, and develop feature correlations within classifications to produce rules. Furthermore, since buffered high definition video is available, the training and generation of rules for a given event can take advantage of the high definition video. The machine learning engine 414 can also be used to refine existing rules. When a positive activation decision 410 occurs, manual review 416 can be used to modify or adjust the rule that generated the positive activation decision, either affirming or disaffirming the positive activation decision.

Figure 5:
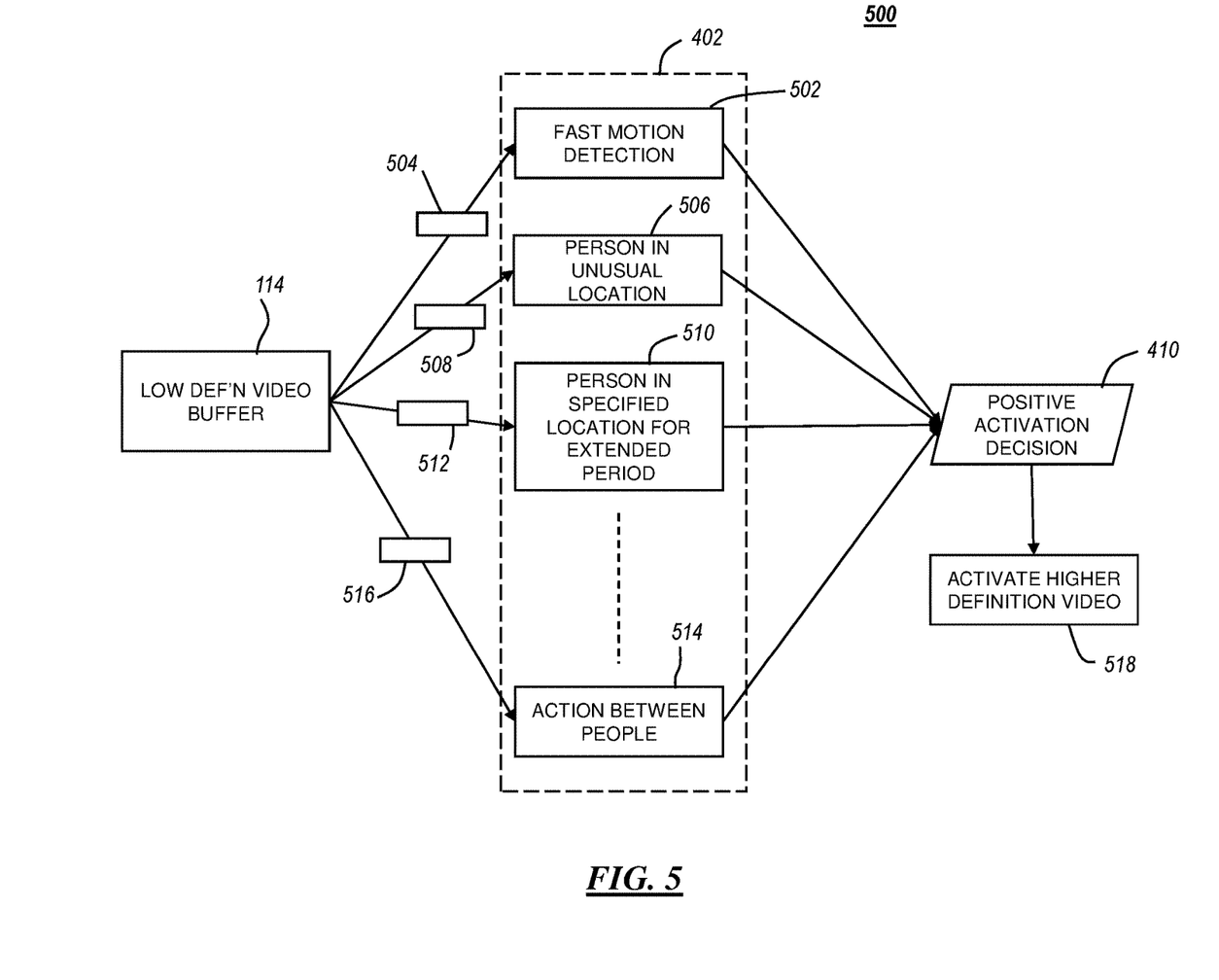
FIG. 5 is a block diagram of a video analysis flow for applying analytic rules for determining whether the trigger a high definition surveillance system component, in accordance with some embodiments.

FIG. 5 is a block diagram of a video analysis flow 500 for applying analytic rules for determining whether to trigger a high definition surveillance system component, in accordance with some embodiments. A low definition video system includes a low definition video buffer 114 that can provide varying lengths of video content to an analytics engine 402. The analytics engine 402 evaluates low definition video content against a plurality of rules 502, 506, 510, 514 to determine if features in the video content match any of the rules 502, 506, 510, 514. The rules 502, 506, 510, 514 can be used to define events such as, for example, fast motion being detected (502), a person in an unusual or prohibited location (506), a person who has remained in a location for an unusual period of time (510), unusual action between persons (514). Numerous other such rules can be formulated for evaluating the low definition video. Furthermore, similar rules can be used to evaluate audio content collected by one or more microphones.

For each rule 502, 506, 510, 514 a video segment 504, 508, 512, 516 is evaluated. Some of the video segments may overlap in time, and they can have varying durations in time depending on the rule being evaluated. For example, a person in an unusual or prohibited location can be recognized immediately, while a person being in a location for an unusual time can only be evaluated over a much longer period of time. Accordingly, each rule 502, 506, 510, 514 can indicate how it is to be evaluated, such as by creating a time counter for a recognized object in a field of view to determine how long it has been in the field of view. Rules can define one or more variables that must be tracked over time in order to determine whether the rule has been met. When the conditions for satisfying any rule is met, then a positive activation decision 410 can be made, and the system can then commence recording high definition video and other contemporaneous media content. Once the activation decision 410 is made, then, for example, the higher definition video stream, including buffered content, can be recorded by activating the higher definition video in block 518. This can be accomplished by activating switches 117, 137 and 143, for example, processing the higher definition video and storing it along with other independent media streams such as audio media.

Figure 6:
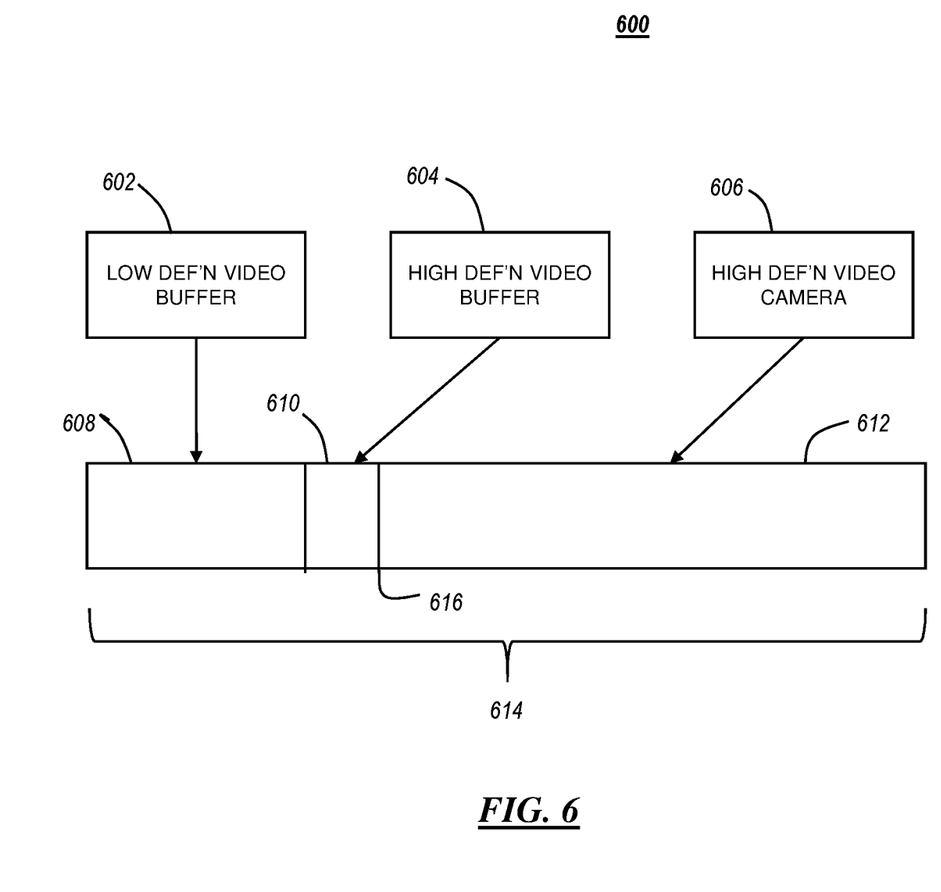
FIG. 6 shows a media formatting for a video produced by a video surveillance system, in accordance with some embodiments.

FIG. 6 shows a media formatting process 600 for video produced by a video surveillance system, in accordance with some embodiments. The process 600 is one example of a possible media formatting and produces a video media record or file 614 from both the lower and higher definition video cameras. Upon being triggered by a recognized event, low definition video 608 is taken from the low definition video buffer 602 (or 114) and used as a prefix. The low definition video buffer 114, 602 can store a longer duration (in time) of video than is stored in the high definition video buffer 116, 604. Accordingly, the low definition video 608 has a start time that is further ahead (e.g. back in time) from a triggering time 616 when the triggering event was detected. The buffered high definition video 610 can be concatenated with the low definition video 608, and the subsequent live or streamed video 612 is added after the buffered high definition video from the high definition video camera 606. The video media file 614 therefore contains video media showing events before the triggering event time 616 that can assist people in determining how the triggering event occurred, what persons were involved, and so on. The low definition video media 608 can be converted to the format used by the high definition video media 610, 612, so that the file 614 uses only one video format.

Figure 7:
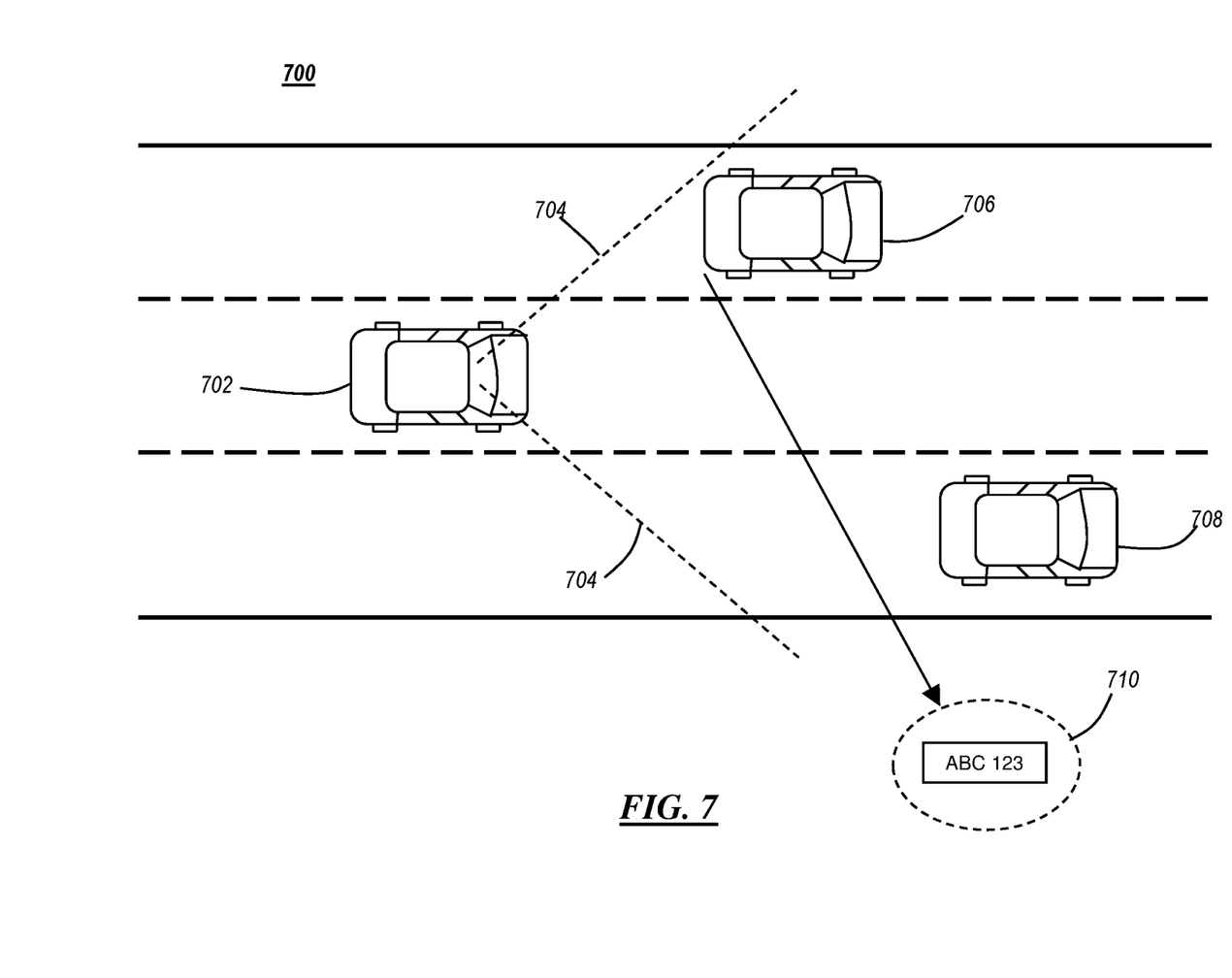
FIG. 7 shows a mobile automotive application of a surveillance system using analytics in response to an event to trigger the use of higher definition video processing, in accordance with some embodiments.

FIG. 7 shows a mobile automotive application of a surveillance system 700 using analytics in response to an event to trigger the use of higher definition video processing, in accordance with some embodiments. The system 700 can be, for example, a vehicular system where cameras are mounted in a vehicle 702, including a lower resolution camera and a higher resolution camera. The vehicular system can be connected to a network by a cellular communication device, and receive messages from an incident API such as that shown and described in FIG. 3. An entity can create and broadcast a message to mobile systems in a given region that includes, as described in FIG. 3, information regarding the type of videographic information to look for, as well as characteristics of the content that defines a potential match. For example, the message can include several fields for describing a vehicle, including color and license tag number. This information can be used by the video system in processing the video content. Specifically, upon receiving the message, the video system in vehicle 702 can commence processing video received from a lower resolution camera, and as video content from the lower resolution camera is processed, the system compares the lower resolution video content with filters created based on the characteristics for matching, which can include color processing, character recognition, and so on. For example, in many places it is common for authorities to issue alerts that include vehicle descriptions. Typically the information is displayed on signs or other display devices over, or adjacent to, roadways for people in passing vehicles to see. Those people can then look for vehicles matching the description. In the USA, these are sometimes referred to as "AMBER alerts," using a backronym created using the name of a child who had been abducted.

The video system in vehicle 702 has a field of view defined by lines 704, and in which vehicles 706, 708 can be seen by the video system. Vehicle 706 has a license tag that includes a vehicle license tag number that can be identified and recognized, as indicated in outset 710. Upon receiving an alert message including, for example, a license tag number, the recognized license tag number can be compared to that indicated in the message, and if there is a match, a report message can be sent to a law enforcement API including the location, direction, road identifier, and so on. As mentioned, while the system is mobile, it still generally follows the operation of a fixed system, using elements in FIGS. 1-6 just as in a fixed system.

Embodiments of the inventive disclosure solve the problems of media storage and media resolution and quality in surveillance systems by utilizing a low definition video system in conjunction with a high (or higher) definition video system. The low definition video system produced a low definition video feed that is buffered, and also processed by an analytics engine to detect both visual and audio events that meet predefined criteria. Upon the occurrence of such an event being detected, the video feed of the high definition video is stored for at least a minimum duration of time. Both the low and high definition video systems can buffer a short duration of video footage that can also be stored with the live high definition video stream in order to have a record of what occurred prior to the triggering event. This novel arrangement reduced the amount of video media that is recorded and stored.

What is claimed is:

1. A video surveillance system, comprising:
   a lower definition video system including a lower definition video camera that is configured to operate continuously and produce a lower definition video stream, the lower definition video system also including a lower definition video buffer in which a lower definition video is continuously recorded as a recent time period of the lower definition of the video stream;
   an event sensor configured to detect at least one type of defined event depicted in the low definition video stream;
   a higher definition video system, including a higher definition video camera, that is normally off, and which is configured to commence operating upon occurrence of the at least one type of defined event being detected by the event sensor to produce a higher definition video stream; and
   a memory in which the lower definition video in the lower definition video buffer is concatenated with the higher definition video stream and stored upon occurrence of the at least one type of defined event.

2. The video surveillance system of claim 1, wherein the higher definition video system further includes an artificial light source that is configured to be activated when the higher definition video system begins operating.

3. The video surveillance system of claim 2, wherein the artificial light source is an infrared light source and the higher definition video system includes an infrared camera.

4. The video surveillance system of claim 1, wherein the event sensor further includes a microphone that is configured to receive acoustic signals from an area in a field of view of the lower definition video camera, and wherein the event sensor is configured to perform natural language processing on the acoustic signal and detect a keyword, wherein the at least one type of defined event includes detecting one of a sound level exceeding a threshold, a voice recognition, or a keyword or phrase utterance recognized by natural language processing.

5. The video surveillance system of claim 1, wherein the event sensor is configured to detect a human in motion in a field of view of the lower definition video camera in the lower definition video stream, and wherein the at least one type of defined event includes detecting a human in motion in the field of view of the lower definition camera.

6. The video surveillance system of claim 1, wherein the lower definition camera is a black and white camera.

7. The video surveillance system of claim 1, wherein the higher definition camera has a resolution that is at least twice a resolution of the lower definition camera.

8. The video surveillance system of claim 1, wherein the event sensor is configured to perform facial recognition, and wherein the at least one type of defined event comprises detecting a matching face.

9. The video surveillance system of claim 1, wherein the higher definition video camera is a first higher definition video camera and is collocated with the lower definition video camera, the system further comprising at least one additional higher definition camera that is not collocated with the lower definition camera.

10. A video surveillance system, comprising:
    a monitoring processor including an image and video processor;

a lower definition video camera coupled to the monitoring processor and configured to provide a lower definition video feed to the monitoring processor, the lower definition video camera having a field of view;

a lower definition video buffer coupled between the lower definition video camera and the monitoring processor, and in which a most recent time duration of the lower definition video feed is buffered;

a higher definition video camera coupled to the monitoring processor and configured to provide a higher definition video feed to the monitoring processor, wherein the higher definition video camera is maintained in a normally off state, the higher definition video camera being arranged to have a field of view that is substantially shared with the field of view of the lower definition video camera;

the monitoring processor is configured to:
process the lower definition video feed to detect any one of a plurality of predefined videographic events; and in response to detection of one of the plurality of predefined videographic events in the lower definition video feed, turn on the higher definition video camera to receive the higher definition video stream, move the buffered most recent time duration of the lower definition video feed in the lower definition video buffer to a video recording medium and concatenate video of the higher definition video stream to the most recent time duration of the lower definition video feed in the video recording medium for at least a preselected period of time.

11. The video surveillance system of claim 10, wherein the monitoring processor is further configured to turn on the higher definition video camera and record the higher definition video stream in response to a user input to the monitoring processor.

12. The video surveillance system of claim 10, further comprising a microphone for capturing audio input in a vicinity of the lower definition video camera, and wherein the monitoring processor is further configured to turn on the higher definition video camera and record the higher definition video stream in response to detection of an audio input received at the microphone that is one of a sound level exceeding a threshold, a voice recognition, or a keyword or phrase utterance recognized by natural language processing.

13. The video surveillance system of claim 10, wherein the plurality of predefined videographic events includes a videographic event defined in a message received by the video surveillance system.

14. The video surveillance system of claim 10, wherein the monitoring processor, lower definition video camera, and higher definition video camera are mounted in a vehicle.

15. The video surveillance system of claim 10, further comprising an artificial light source that is configured to be activated when the higher definition video camera is turned on.

16. A method of operating a video surveillance system having a lower definition video camera and a higher definition video camera, comprising:

receiving, at a monitoring processor, a plurality of inputs including a lower definition video stream from the lower definition video camera;

continuously buffering a most recent time duration of the lower definition video stream in a first video buffer;

continuously buffering a most recent time duration of a higher definition video stream output by the higher definition video camera in a second video buffer while buffering the lower definition video stream, and wherein the most recent time duration of the higher definition video stream is a shorter time duration than the most recent time duration of the lower definition video stream;

detecting, by the monitoring processor, an occurrence of a predefined event in at least one of the plurality of inputs; and in response to detecting the occurrence of the predefined event, concatenating the buffered most recent time duration of the lower definition video stream, the buffered most recent time duration of a higher definition video stream, and the higher definition video stream subsequent to the most recent time duration of a higher definition video stream to be stored as a video record.

17. The method of claim 16, wherein detecting the occurrence of a predefined event comprises recognizing, by the monitoring processor, a predefined pattern in the lower definition video stream.

18. The method of claim 16, wherein detecting the occurrence of a predefined event comprises recognizing, by the monitoring processor, a predefined audio pattern in an audio input.

19. The method of claim 16, wherein receiving the plurality of inputs comprises receiving a message including a definition of one of an audio pattern or a videographic pattern.

20. The method of claim 19, wherein the videographic pattern comprises a vehicle license tag number.

21. The method of claim 16, wherein detecting the occurrence of the predefined event comprises determination of a body temperature of a person being above a preselected temperature threshold.

22. The method of claim 16, further comprising generating at least one rule using a machine learning process to define the predefined event.

* * * * *